No. 631,179. Patented Aug. 15, 1899.
B. A. RUCKER.
PIPE PATCH.
(Application filed May 8, 1899.)
(No Model.)
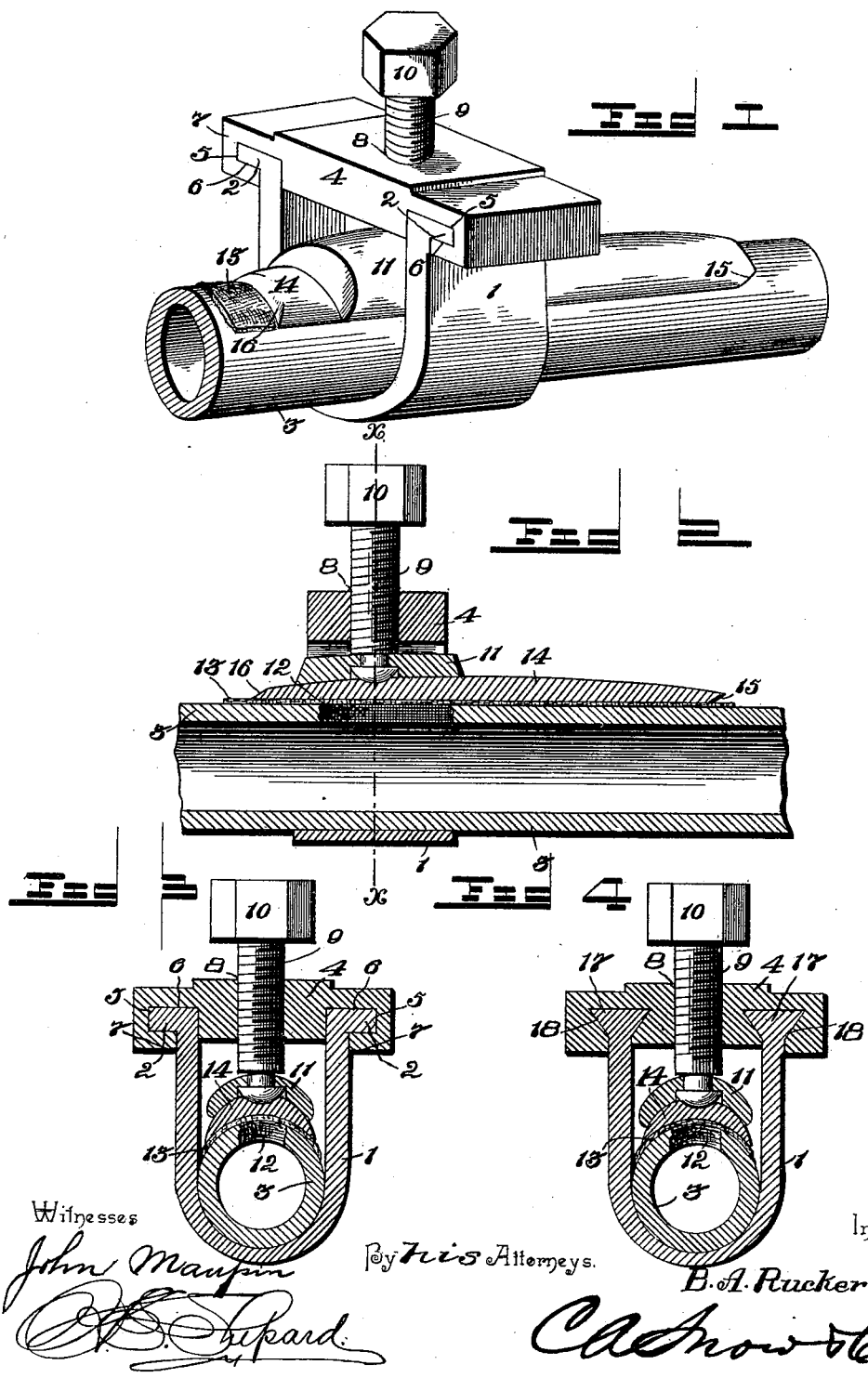
Witnesses
John Maupin
Inventor
B. A. Rucker
By his Attorneys.
C. A. Snow & Co.

UNITED STATES PATENT OFFICE.

BENJAMIN A. RUCKER, OF BEDFORD CITY, VIRGINIA.

PIPE-PATCH.

SPECIFICATION forming part of Letters Patent No. 631,179, dated August 15, 1899.

Application filed May 8, 1899. Serial No. 715,970. (No model.)

*To all whom it may concern:*

Be it known that I, BENJAMIN A. RUCKER, a citizen of the United States, residing at Bedford City, in the county of Bedford and State of Virginia, have invented a new and useful Pipe-Patch, of which the following is a specification.

This invention relates to pipe-patches of that class embodying a substantially U-shaped clamping-strap and a yoke connecting the ends thereof; and the object of the invention is to provide an improved removable connection between the clamping-strap and the yoke, whereby the positioning and removal of the device is facilitated, and leaks in steam, gas, water, and other pipes may be readily and effectively stopped.

To this end the present invention consists in the combination and arrangement of parts, as will be hereinafter more fully described, shown in the accompanying drawings, and particularly pointed out in the appended claims.

In the drawings, Figure 1 is a perspective view of the device applied in operative position to a length of pipe. Fig. 2 is a longitudinal sectional view thereof. Fig. 3 is a transverse sectional view taken on the line $x$ $x$, Fig. 2. Fig. 4 is a transverse sectional view of a modified form of the invention.

Referring to the accompanying drawings, 1 designates a substantially U-shaped clamp formed from a single strap of flat metal having the extremities of its ends bent outward in opposite directions, so as to provide the divergent shoulders 2. This clamp is adapted to embrace a length of pipe 3, having the shouldered ends 2 extending beyond one side of the pipe and connected transversely thereof by means of a yoke 4, formed from a single flat bar of metal. The under face of the yoke, near opposite ends thereof, is provided with substantially L-shaped grooves 5, having the horizontal members 6 thereof extending outwardly in opposite directions from each other, and the vertical members 7 communicating with the horizontal members at the inner ends thereof. It will be understood that after the clamp member 1 has been engaged with the pipe the yoke 4 is connected therewith by receiving the shouldered ends 2 transversely within the L-shaped grooves 5, whereby the two members may be readily connected together in an effective manner.

Intermediate of the ends of the yoke there is provided a vertically-threaded opening 8, adapted to receive a binding-screw 9, having its head 10 located above the yoke and its lower end projecting below the yoke and provided with a clamping-foot 11, comprising a plate bowed transversely and swiveled to the extremity of the binding-screw.

In the application of the device to close an opening 12 in the pipe 3 the U-shaped clamp 1 is engaged about the plate opposite the opening, so that when the yoke 4 is connected to the ends of the clamp the clamping-foot will be located directly opposite the opening. A strip of suitable packing material 13 is then placed over the opening and the metallic plate 14 is interposed between the packing-strip and the swiveled clamping-foot 11. This plate is concaved upon its inner face, so as to fit snugly the pipe to which it may be applied, and the opposite ends of the plate are beveled, as at 15 and 16, one upon the inner side of the plate and the other upon the outer side thereof. After the packing-strip and the plate 14 have been positioned the binding-screw is operated to clamp the foot 11 tightly against the outer face of the plate 14, whereby the latter and the packing-strip are firmly clamped over the opening 12 and the latter is effectively closed, so as to prevent escape or leakage of the contents of the pipe.

It will be understood that a long crack in a pipe may be conveniently covered by the employment of a plurality of plates 14, as the adjacent ends thereof being beveled in opposite directions are adapted to overlap and provide a substantially continuous plate to which a plurality of the clamping devices may be applied so as to effectively bind the several plates upon the crack, and thereby close the same against leakage.

A modified form of the invention is shown in Fig. 4, and consists in providing the ends of the U-shaped clamp member with the enlarged dovetailed shoulders 17, adapted to be received laterally into complementary dovetailed grooves 18, provided in the under face of the yoke. In each form it will be seen that the enlarged shoulders 2 and 17, respectively, engage against the lower faces of the respective grooves 5 and 18, so that the clamp member and the yoke member cannot be separated longitudinally by the pressure of the binding-screw, and therefore the parts are substantially connected together. However, the members of each form are adapted to be assembled and separated by receiving the enlarged heads of the clamping member transversely within the grooves of the yoke member, so as to facilitate such operations.

By the construction and arrangement as hereinbefore described a simple, durable, and effective pipe-patch is provided having the parts thereof substantially connected together and the members adapted to be readily assembled and separated, so as to facilitate the application to and removal from the pipe-section.

Changes in the form, proportion, size, and the minor details of construction within the scope of the appended claims may be resorted to without departing from the spirit or sacrificing any of the advantages of this invention.

What I claim is—

1. In a pipe-patch, the combination of a substantially U-shaped clamping member having its opposite ends provided with enlarged shoulders, a yoke member provided with transverse grooves formed in the under face, and located near opposite ends thereof and adapted to receive the shouldered ends of the clamping member transversely within the grooves, whereby the two members may be removably connected together, and a binding-screw carried by the yoke intermediate of the ends thereof, substantially as and for the purpose set forth.

2. In a pipe-patch, the combination of a substantially U-shaped clamping member formed from a flat metal strap having its opposite ends bent transversely outward to provide oppositely-extending shoulders, a yoke member having substantially L-shaped grooves formed in its under face near opposite ends thereof and adapted to receive the respective transverse shoulders of the clamping member, and a binding-screw carried by the yoke and located intermediate of the ends thereof, substantially as and for the purpose set forth.

3. In a pipe-patch, the combination with a substantially U-shaped clamping member having a yoke connecting the ends of the clamping member and provided with a binding-screw, of a plate adapted to be interposed between the foot of the screw and the pipe, one end of the pipe being beveled upon the inner side and the opposite end being beveled upon the outer side thereof, substantially as and for the purpose set forth.

In testimony that I claim the foregoing as my own I have hereto affixed my signature in the presence of two witnesses.

BENJAMIN A. RUCKER.

Witnesses:
M. T. HARRISON,
FLOYD GRAY.